Figure 1:
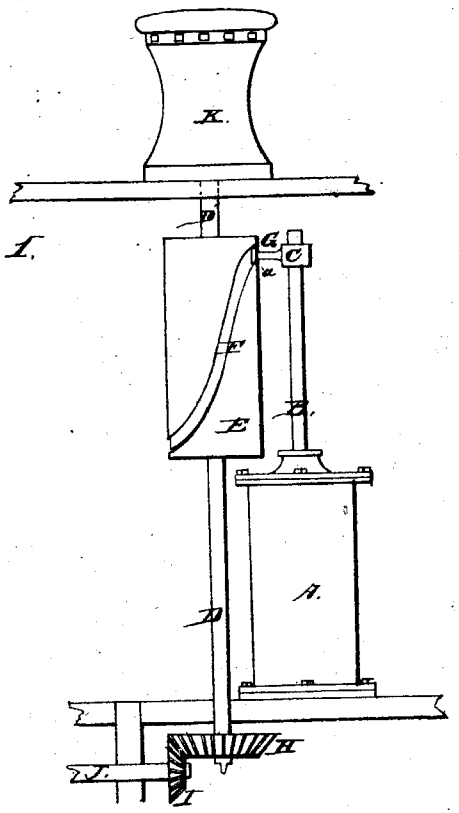
Figure 2:
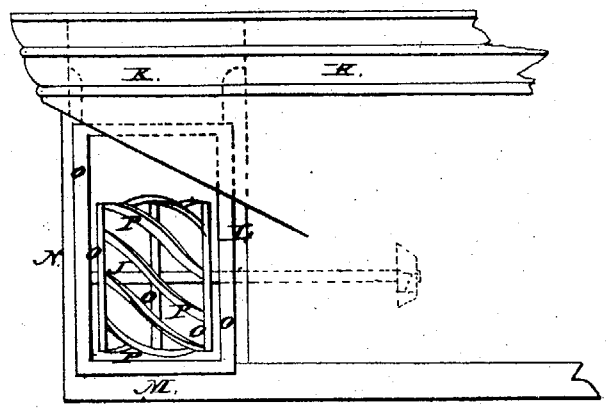
Figure 3:
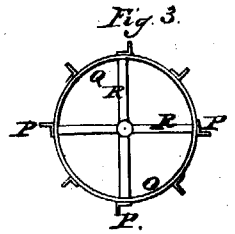

8053X

J. B. Emerson.

Screw Propeller.

Patented Mar. 8, 1834.

Reissued [illegible] vol. 2 [illegible] 297 [illegible] original Patent

367

John Brown Emerson

Letters Patent Patented March 8. 1834.

The Schedule referred to in these Letters Patent and making part of the same containing a description in the words of the said John Brown Emerson himself of his improvement in the Steam Engine —

To all to whom it may concern. Be it known that I, John Brown Emerson of the City of New York, have invented certain improvements in the Steam Engine &c and in the mode of propelling therewith, either vessels on the water, or carriages on the land and that the following is a full and exact description thereof. One object of my improvement is to substitute for the crank motion a mode of converting the reciprocating motion of a piston into a continued rotary motion, by a new combination of machinery for that purpose. This mode is applicable to an Engine [illegible] with one or with two cylinders, and is carried into effect as follows. Along side of the cylinder I place a shaft, the lower end of which may revolve in a step on the platform, or foundation upon which the cylinder stands in which case it must be somewhat longer than twice the length of the cylinder, as it must extend above it to a height somewhat greater than the length of the stroke of the piston, sometimes however, this shaft may have it's lower gudgeon only a small distance below the upper ends of the cylinders whence it must extend above it as, before. Its upper gudgeon must of course be sustained by a suitable frame. This shaft is to stand parallel to the piston rods, from which it is to receive its driving motion. Upon the upper end of this shaft, above the top of the cylinder, there is to be placed a solid cylinder of wood, or of any other convenient substance of such diameter as shall cause its periphery to come nearly into contact with the piston rod G its whole length, when the piston is raised.
The solid cylinder above described is to be made to revolve in the following manner. I make a groove in it which commences near its lower end, and passing spirally extends half way round it by the time it reaches nearly to the upper end, or to a distance vertically equal to the stroke of the Engine. from that point it passes down, around the opposite half and returns into it self at the point of beginning; upon the upper end of the piston against its side, I place a friction roller, which is to work in the groove in the solid cylinder, the piston rod rising between parallel guide pieces by which it is kept in its proper place, and its tendency to turn round by the action of the roller in the groove is checked. When the piston is down, this friction roller will stand in the V formed junction of the grooves on the opposite sides, and as it is raised it will on its passage to the upper junction, give half a revolution to the solid cylinder and in descending will complete the revolution by the action of the friction roller on the other portion of the groove — When two steam cylinders are used, they are to be placed parallel to each other and at such distance a part that the pistons of each may in like manner act upon the solid cylinder, the piston of one being up, when the other is down. The boiler, the steam pipe, the valves for the admission and discharge of steam and other appendages may be similar to some of those already in use — From the revolving shaft already described a rotary motion may be communicated to paddle wheels, steam carriages, or other objects. As it is my intention in general to place my cylinders and
x revolving shaft vertically, I communicate motion to the horizontal shaft of a paddle wheel by means of bevel geared wheels near the lower end or at any convenient part of the shaft and by similar gearing Carriages may be propulled up on Rail or ordinary roads — When used for Steamboats
I employ an improved spiral paddle wheel differing essentially
from those which have heretofore been essayed. This spiral I make
of taking a piece of metal of such length as I intend the spiral
propeller to be, and of a suitable width, say for example eight-
een inches; this I bend along the centre so as to form two sides
say of nine inches in width standing at right angles or nearly
so to each other, and give to it longitudinally the spiral
curvature which I wish. of these pieces I prepare two three or
more, and fix them on to the outer end of the paddle shaft by means
of arms of a suitable length, say of two feet more or less, in such a
position that the trough form given to them longitudinally shall be
effective in acting upon the water — It must be entirely under
water and operate in the direction of the Boat's way. Instead of metal
the spiral propeller may be formed of wood worked into the proper
form the shape and not the material thereof being the only point
of importance — — Where a Capstan is required as on board of
a Steam Boat, I allow the upper end of the vertical shaft before
described to pass up through the deck of the vessel and attach the
capstan thereto so that it may be made to revolve by the action of
the shaft, using such cog wheels and pallets to connect the shaft
and the capstan as will allow of their being conveniently en-
gaged and disengaged. What I claim as my invention
and for which I ask a patent is the substituting for the crank
in the reciprocating engine a grooved cylinder operating in
the manner herein before described by means of its connec-
tion with the piston rods, together with all the variations
of which this principle is susceptible. As for example a
bar of metal may be bent in the form of the groove and
attached to the revolving shaft, and friction wheels on
the piston rod may embrace this on each side producing
an effect similar to that produced by the groove. —

Drawing

40539

I also claim the spiral propelling wheel constructed, and opera-
ting in the manner in which I have set forth and likewise
the application of the revolving vertical shaft to the turn-
ing of a capstan on the deck of a vessel. Not intending in either
of these parts to confine myself to precise forms or dimensions
but to vary them in such manner as experience or convenience
may dictate, whilst the principle of action remains un-
changed, and similar results are produced by similar
means.

Witnesses } signed John Brown Emerson
M. E. Jones
Jos. Andrews

Exd.
N.G. (1144 words)

Clerks Office
Circuit Court of the United States ninth Circuit
In and for the Eastern district of Louisiana. —
I certify the foregoing to be a true copy from the original
on record in this Office.
Witness my hand and the seal of the Court at New
Orleans this twentieth day of April in the
year of our Lord Eighteen hundred and forty one
(Seal) Duncan N. Hennen Clk Exd.
N.G. (68 words)